No. 646,089. Patented Mar. 27, 1900.
F. R. ERAL.
CORN PLANTER ATTACHMENT.
(Application filed Aug. 14, 1899.)
(No Model.)
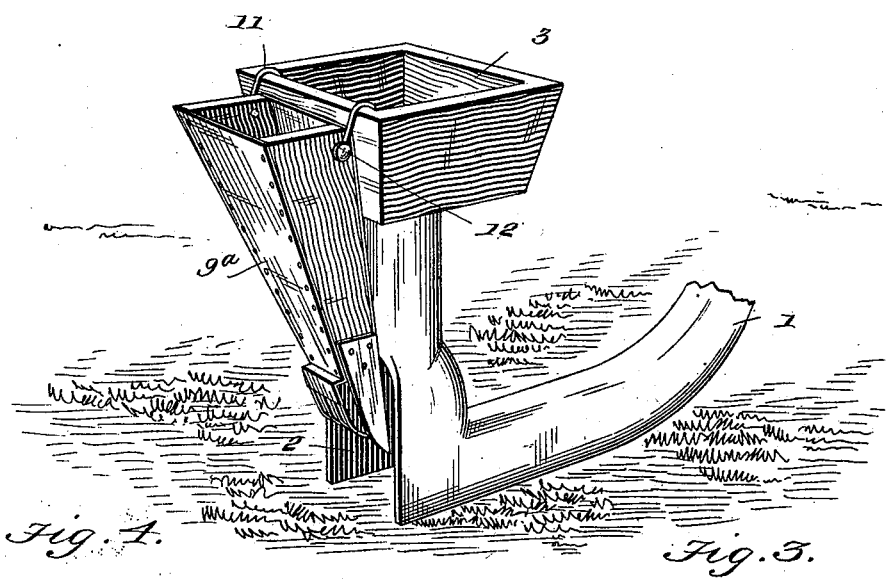
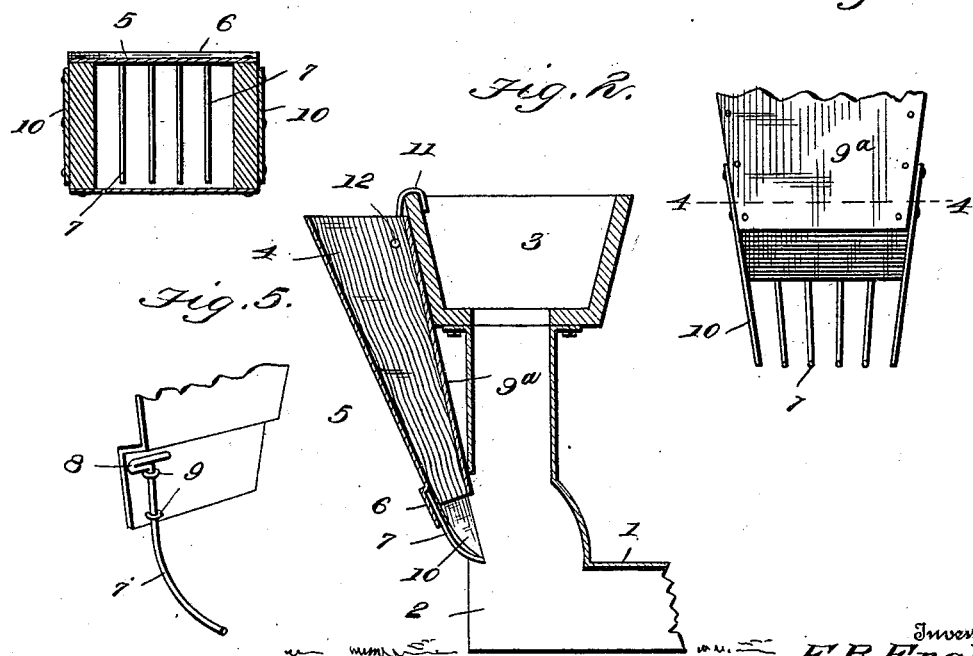
Witnesses
Inventor
F. R. Eral,

UNITED STATES PATENT OFFICE.

FRANK R. ERAL, OF ROLFE, IOWA.

CORN-PLANTER ATTACHMENT.

SPECIFICATION forming part of Letters Patent No. 646,089, dated March 27, 1900.

Application filed August 14, 1899. Serial No. 727,194. (No model.)

*To all whom it may concern:*

Be it known that I, FRANK R. ERAL, a citizen of the United States, residing at Rolfe, in the county of Pocahontas and State of Iowa, have invented a new and useful Corn-Planter Attachment, of which the following is a specification.

My invention relates to attachments for a corn-planter with which potatoes may be readily and effectively planted with a saving in labor and potatoes.

It consists in a chute gradually tapering from the top toward the bottom, provided with curved spring-fingers removably secured to the bottom. The attachment is detachably secured to the usual seedbox of a corn-planter at its upper end, while the lower end and the spring-finger hang slightly within the hollow runner of the planter.

In the drawings which accompany this application and form a part thereof, Figure 1 is a perspective view of the runner and seedbox of a corn-planter with my attachment in position. Fig. 2 is a central vertical section of the same, the runner being broken away. Fig. 3 is a front elevation of the attachment, the upper portion being broken away. Fig. 4 is a cross-section of the same on the line 4 4 of Fig. 3. Fig. 5 is a detail perspective view of the end of the attachment and spring-finger.

1 represents the runner of a corn-planter of the usual hollow construction, having the opening 2 in its standard.

3 is a seedbox mounted upon the hollow standard of the runner in the usual manner.

4 is the attachment, consisting of a chute which is tapered from the top toward the bottom. The bottom 5 of the chute is preferably of tin, which is depressed at 6 to form a bearing for the spring-fingers 7. The spring-finger is bent upon itself at the upper end to form a head 8.

9 are eyes adapted to receive and hold the spring-fingers, the head of said fingers resting flat against the depression 6, thereby preventing the fingers from turning, as will be readily understood from the showing in Fig. 5. The depression 6 in the bottom 5 extends below the top 9ª of the chute, while the spring-fingers extend a considerable distance below the depression 6 and are curved to such an extent that they extend almost across the opening of the chute, as seen in Fig. 4.

10 are deflectors or side shields extending downwardly from the bottom of the side of the chute to a point in line with the bottom of the spring-fingers.

11 are hooks pivoted at 12 to the sides of the chute near the top, said hooks being adapted to lie hooked onto the edge of the seedbox 3, and thus suspend the attachment.

It will be observed from Fig. 2 that the lower or discharging end of this attachment hangs considerably within the opening 2 in the runner 1.

In use the attachment is suspended by means of the hooks 11 from the seedbox 3, the lower end of the chute extending some distance within the opening 2 of the runner. Seed-potatoes are dropped into the chute and roll down on the bottom 5 upon the spring-fingers 7, which by reason of their resiliency throw the potatoes gently well into the hollow runner, where they fall into the furrow, the sides of the runner preventing them from scattering over the ground, thus saving a large percentage of seed that has heretofore been wasted. The side shields 10 prevent the potatoes from falling sidewise off the spring-fingers.

From the above it will be seen that my attachment so thoroughly prevents waste of seed that small boys may be employed to drop the potatoes into the attachment.

Having thus fully described my invention, what I claim as new, and desire to secure by Letters Patent of the United States, is—

1. An attachment for a corn-planter, comprising a tapered chute, spring-fingers and side guards depending from the lower end of the chute, substantially as, and for the purpose described.

2. An attachment for corn-planters, comprising a tapered chute having a depression in the lower end of its bottom, curved spring-fingers seated in said depression and side guards, said fingers and guards depending from the chute, substantially as, and for the purpose described.

3. An attachment for a corn-planter, comprising a tapered chute curved spring-fingers depending from and extending across the mouth of the chute and guards depending from the side of the chute, substantially as, and for the purpose described.

4. A potato-planter, comprising a tapering chute having a depression in the lower end of its bottom curved spring-fingers secured in said depression and depending therefrom, and extending upwardly a distance equal to the width of the chute, side guards depending from the sides of the chutes on each side of the spring-fingers and means for suspending the planter attachment, substantially as, and for the purpose described.

5. The combination with a corn-planter, having a hollow runner open at the back and a seedbox of an attachment comprising a chute, having a depression in its bottom, a series of curved spring-fingers secured in said depression depending from the same and extending upward a distance equal to the width of the chute, side guards depending from the sides of the chute, beside the spring-fingers and hooks pivoted near the top of the chute by means of which the attachment is suspended from the seedbox of the corn-planter, substantially as described.

FRANK R. ERAL.

Witnesses:
GEO. A. HEALD,
FRANK S. STEGGE.